United States Patent Office 3,225,077
Patented Dec. 21, 1965

3,225,077
N-CYANOIMIDATES AND PROCESSES FOR PREPARING SAME
Frederic Charles Schaefer, Munich-Solln, Germany, and Kenneth Robert Huffman, Stamford, Conn., assignors to American Cyanamid Company, Stamford, Conn., a corporation of Maine
No Drawing. Filed Mar. 5, 1963, Ser. No. 262,851
10 Claims. (Cl. 260—453)

This invention relates to novel chemical compounds and to processes for preparing the same. More particularly, it relates to N-cyanoimidates and to processes for preparing the same.

While N-cyanoisoureas and N-acylimidates are known, N-cyanoimidates although they may be possibly considered as somewhat similar to each of these classes of compounds, have not been previously described. However, the reactions of N-cyanoisoureas and N-acylimidates have not been extensively studied.

It has now been discovered that N-cyanoimidates of the formula:

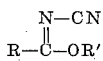

in which R is selected from the group consisting of hydrogen, alkyl, halo-, carbalkoxy- and aryl-substituted alkyl, aryl, halo-, nitro- and alkyl-substituted aryl and R' is lower alkyl may be prepared by one or several methods which will be more fully described hereinafter.

The novel N-cyanoimidates may be readily synthesized in good yields by (A) reaction of an ortho ester with cyanamide in the presence of an acid anhydride according to the following equation:

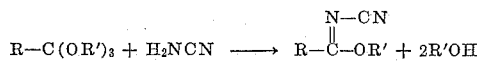

(B) the reaction of a ketene acetal with cyanamide according to the following equation:

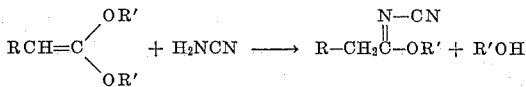

(C) the reaction of an imidate hydrohalide with cyanamide according to the following equation:

and (D) the reaction of an imidate with a cyanogen halide according to the following equation:

In all of the foregoing reaction schemes, R and R' are as defined hereinabove and X is halogen.

The N-cyanoimidates of this invention are a new class of reactive intermediates which may be reacted further to give 2-amino-s-triazines as described and claimed in copending applications Serial Nos. 262,857, now U.S. Patent No. 3,154,547, and 262,858, filed concurrently herewith; 2-amino-s-triazine-1-oxides as described and claimed in copending application Serial No. 262,861, filed concurrently herewith, now U.S. Patent No. 3,154,548; 5-amino-1,2,4-oxadiazoles as described and claimed in copending application Serial No. 262,843, filed concurrently herewith; 3-amino-1,2,4-triazoles, N,N' - dicyanoamidine salts as described and claimed in copending application Serial No. 262,850, filed concurrently herewith; and N-cyano-N'-substituted amidines.

Generally, the choice of synthetic method will be determined by the specific N-cyanoimidate to be prepared. Thus, the process described as reaction A will ordinarily be employed because of the ease of preparation of the starting ortho esters. This procedure consists simply of heating the ortho ester with cyanamide and two equivalents of an acid anhydride at a temperature of from about 120° C. to about 150° C. for periods of fifteen minutes to one hour while distilling off the thus formed ester and carboxylic acid. The pure N-cyanoimidate is then isolated by distillation. Suitable acid anhydrides are acetic anhydride, propionic anhydride and the like. Acetic anhydride is ordinarily employed. However, acid catalysts may also be utilized. Among these, p-toluene sulfonic acid may be used in catalytic amounts in large scale reactions wherein the use of large quantities of an acid anhydride might be disadvantageous.

The process described as reaction (C) is also extremely valuable for the preparation of the novel compounds of this invention. Thus, this procedure consists simply of mixing an imidate hydrohalide, e.g., hydrochloride, the hydrobromide or the hydroiodide, preferably the hydrochloride, at a temperature of from about 0° to about 50° C. with cyanamide in an inert reaction medium, i.e., a non-aqueous polar solvent, e.g., an alcohol, filtering by-product ammonium halide after a suitable reaction period, usually several hours, and isolating the product by distillation. Yields of from about 60 to about 65% are usually obtained. While it might be expected that the interfering reaction of an imidate hydrohalide with the solvent, i.e., alcohol, to give an ortho ester may take place, analysis, physical properties and infrared spectrum of the final products did not show this to be the case. Ordinarily, this method is best suited to the preparation of N-cyanoimidates in which the R group thereof is alkyl or aralkyl.

The process described as B in the reaction schemes above is eminently suitable for introducing into N-cyanoimidates a potentially active methylene group. Its applicability is somewhat limited, however, because of the relative inaccessibility of the starting ketene acetals. The process involves treatment of such ketene acetal with cyanamide in the presence of one equivalent of an acid anhydride such as acetic anhydride, propionic anhydride or the like at a temperature of from about 120° to about 150° C. and subsequently recovering the resultant N-cyanoimidate by distillation.

Finally, the process of this invention described as reaction D hereinabove is an extremely versatile one. In the presence of a suitable acid acceptor, this process is the most attractive route to N-cyanoimidates. Generally, the reaction is carried out in an inert reaction medium, e.g., water, ether and the like, at a temperature of from about 0° to about 30° C. by reacting equivalent amounts of an imidate and cyanogen halide, e.g., cyanogen chloride or cyanogen bromide, in the presence of a suitable base, e.g., an alkaline earth metal hydroxide, i.e., calcium hydroxide or the like, to take up the hydrogen halide which is split out during the course of the reaction. The resultant N-cyanoimidate is then recovered by distillation or extraction. The reaction may also be conducted by employing two moles of imidate for each mole of cyanogen halide one mole of imidate thus serving as the base to combine with the hydrogen halide liberated during the reaction.

The starting aliphatic ortho esters are usually prepared by allowing the corresponding imidate hydrohalide to stand in an aliphatic alcohol, e.g., methanol, ethanol and the like, at room temperature for several days. Aromatic ortho esters are prepared by reacting an aryltrihalo methane with an alkali metal alkoxide. Ketene acetals are obtained following the procedure of McElvain and Schroeder, J. Am. Chem. Soc., 71, 40 (1949). The imidates and imidate hydrohalides are prepared by any one of numerous known methods.

In general, equivalent amounts of cyanamide and an ortho ester are dissolved in two equivalents of acid anhydride and the resultant solution is heated to 120° to 150° C. at which point the ester begins to distill rapidly. Following the subsidence of the initial vigorous reaction, the heating is continued until most of the ester and carboxylic acid are distilled. The residual liquor is then distilled under vacuum. Suitable ortho esters which may be employed in the process of this invention are included in the following non-limiting listing: trimethyl orthoformate, triethyl orthoformate, trimethyl orthoacetate, triethyl orthoacetate, trimethyl orthobenzoate, triethyl orthobenzoate, trimethyl-2-chloro orthoacetate, triethyl-2-chloro orthoacetate, trimethyl-p-chloro orthobenzoate, trimethyl-p-bromo orthobenzoate, trimethyl-p-nitro orthobenzoate, trimethyl ortho-p-toluate, trimethyl 2-phenyl-orthoacetate, triethyl 2-carbethoxy-orthoacetate and the like. Illustrative ketene acetals which may be reacted with cyanamide according to the process of this invention are carbethoxy ketene diethyl acetal, benzoyl ketene diethyl acetal and cyano ketene diethyl acetal. Typical imidate hydrohalides, preferably the hydrochloride, which may be employed in the process of the present invention involving the use of cyanamide include the salts of: ethyl acetimidate, isopropyl acetimidate, ethyl propionimidate, ethyl butyrimidate methyl isopropionimidate, methyl benzimidate, ethyl-α-phenyl acetimidate, methyl-α-chloro acetimidate, ethyl - α - chloropropionimidate, methyl laurimidate, ethyl-m-nitrobenzimidate and the like. Such imidate salts as well as other suitable imidate salts may be readily prepared by reacting a mixture of the appropriate nitrile and an alcohol in the presence of a mineral acid such as hydrochloric acid or hydrobromic acid. The free imidate base of the just named imidate hydrohalides may be employed in the process involving the use of cyanogen halide. Such free bases are obtained by treatment of the imidate hydrohalides with suitable inorganic bases.

N-cyanoimidates of this invention are usually colorless liquids characterized by elemental analyses and infrared absorption spectra. These compounds exhibit strong nitrile bands near $4.5\mu$ and strong C=N bands near $6.2\mu$ with no absorption in the N—H or carbonyl region.

In order to illustrate the present invention, the following non-limiting examples are given:

EXAMPLE 1

(A) *Reaction of orthoesters with cyanamide*

(a) ETHYL N-CYANOACETIMIDATE

Into a suitable reaction vessel are introduced 4.2 g. (0.1 mole) of cyanamide, 16.2 g. (0.1 mole) of triethyl orthoacetate and 20.4 g. (0.2 mole) of acetic anhydride. The resulting solution is then heated to 130–140° C. at which point the alkyl acetate begins to distill out rapidly. The oil bath heating means is removed until the initial vigorous reaction subsides and then heating is continued for one hour at 135–150° C. until most of the alkyl acetate and acetic acid are distilled. The residual liquor is then distilled under vacuum. A total of 10.1 g. (90% yield) of product is obtained; B.P. 90–95° C. (20 mm.).

*Analysis.*—Calculated for $C_5H_8N_2O$: C, 53.55; H, 7.19; N, 24.99. Found: C, 53.56; H, 7.52; N, 24.61.

(b) ETHYL N-CYANOFORMIMIDATE

The procedure of Example 1(a) is repeated in all essential respects except that 14.8 g. (0.1 mole) of triethyl orthoformate are employed. A total of 8.8 g. (90% yield) of product is obtained; B.P. 58–63° C. (0.1 mm.).

*Analysis.*—Calculated for $C_4H_6N_2O$: C, 48.97; H, 6.17; N, 28.56. Found: C, 49.26; H, 6.18; N, 28.37.

(c) METHYL N-CYANOBENZIMIDATE

The procedure of Example 1(a) is repeated in all essential respects except that 18.2 g. (0.1 mole) of trimethyl orthobenzoate are employed; the reaction time is 20 minutes and the reaction temperature is 150° C. A total of 9.75 g. (61% yield) of product is obtained; B.P. 115–125° C. (0.3 mm.).

*Analysis.*—Calculated for $C_9H_8N_2O$: C, 67.48; H, 5.03; N, 17.49. Found: C, 67.18; H, 4.99; N, 17.34.

(d) METHYL 2-CHLORO-N-CYANOACETIMIDATE

The procedure of Example 1(a) is repeated in all essential respects except that 15.45 g. (0.1 mole) of trimethyl-2-chloroorthoacetate are employed, the reaction time is 30 minutes and the reaction temperature is 130° C. A total of 9.9 g. (75% yield) of product is obtained; B.P. 76–80° C. (0.3 mm.).

*Analysis.*—Calculated for $C_4H_5N_2OCl$: C, 36.24; H, 3.80; N, 20.31. Found: C, 36.54; H, 3.88; N, 20.43.

EXAMPLE 2

(B) *Reaction of ketene acetals with cyanamide*

ETHYL 2-CARBETHOXY-N-CYANOACETIMIDATE

In a suitable reaction vessel are placed 4.2 g. (0.1 mole) of cyanamide, 18.8 g. (0.1 mole) of carbethoxyketene diethyl acetal and 10.2 g. (0.1 mole) of acetic anhydride. The resulting solution is then heated to 130–140° C. at which point the alkyl acetate begins to distill out rapidly. The heating means is removed until the initial vigorous reaction subsides and then the heating is continued for fifteen minutes at 150° C. until most of the alkyl acetate and acetic acid is distilled. The residual liquor is then distilled under vacuum. A total of 13.9 g. (74% yield) of product is obtained; B.P. 103–106° C. (0.3 mm.).

*Analysis.*—Calculated for $C_8H_{12}N_2O_3$: C, 52.16; H, 6.57; N, 15.21. Found: C, 52.22; H, 6.39; N, 1485.

EXAMPLE 3

(C) *Reaction of imidate hydrohalides with cyanamide*

(a) METHYL N-CYANOACETIMIDATE

To a solution of 19.6 g. (0.47 mole) of freshly purified cyanamide in 70 ml. of dry methanol is added 51.1 g. (0.47 mole) of methyl acetimidate hydrochloride. The resulting mixture is shaken for a few minutes and then allowed to stand at room temperature for three hours. After removal of the ammonium chloride by filtration the methanol is stripped from the filtrate and the product is distilled rapidly. Redistillation gives 30.1 g. (66% yield) of methyl N-cyanoacetimidate; B.P. 98–99° C. (25 mm.).

*Analysis.*—Calculated for $C_4H_6N_2O$: C, 48.97; H, 6.16; N, 28.56. Found: C, 49.23; H, 6.50; N, 28.60.

(b) ETHYL N-CYANOACETIMIDATE

The procedure of Example 3(a) is repeated in all essential respects except that ethyl acetimidate hydrochloride in ethanol is used. The yield is 65%; B.P. 95–96° C. (15 mm.).

(c) ETHYL 2-CHLORO-N-CYANOPROPIONIMIDATE

The procedure of Example 3(a) is repeated in all essential respects except that ethyl 2-chloropropionimidate in ethanol is used. The yield is 37.5 g. (50% yield); B.P. 106–111° C. (1.5 mm.).

EXAMPLE 4

(D) *Reaction of imidates with cyanogen halide*

(a) METHYL N-CYANOACETIMIDATE

A solution of 14.6 g. (0.20 mole) of methyl acetimidate in 100 ml. of ether is stirred in an ice bath while 6.2 g. (0.10 mole) of cyanogen chloride is slowly distilled in. The solution is stoppered and stored at 0° C. for six hours and then at room temperature overnight. Filtration at this point yielded 3.5 g. (32% yield) of methyl acetimidate hydrochloride. Removal of the ether and distillation afforded 3.5 g. (43% yield) of trimethyl-s-triazine; B.P. to 63° C. (20 mm.), which solidified in the condenser, and 2.3 g. (23% yield) of methyl N-cyanoacetimidate; B.P. 90–92° C. (20 mm.).

(b) METHYL N-CYANOBENZIMIDATE

A suspension of 3.75 g. (0.050) of calcium hydroxide and 13.5 g. (0.10 mole) of methyl benzimidate in 50 ml. of water is stirred in an ice bath while 6.3 (0.10 mole) of cyanogen chloride is distilled in. The resulting mixture is stoppered and stirred for 2.5 hours. The aqueous mixture is filtered and extracted several times with ether. The extracts are combined, dried over sodium sulfate and evaporated to give 3.2 g. of a pale yellow liquid. Infrared analysis shows that this is 75% methyl N-cyanobenzimidate (15% yield).

While the present invention has been described in detail as to specific embodiments thereof, it is not intended that these details constitute undue limitations upon the scope of the invention, excepting, of course, insofar as these limitations appear in the appended claims.

We claim:
1. An N-cyanoimidate of the formula:

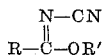

in which R is selected from the group consisting of hydrogen, alkyl, halo-, carbethoxy and phenyl-substituted lower alkyl, phenyl, halo-, nitro-, and lower alkyl-substituted phenyl and R' is lower alkyl.
2. Ethyl N-cyanoacetimidate.
3. Methyl N-cyanobenzimidate.
4. Methyl 2-chloro-N-cyanoacetimidate.
5. Ethyl 2-carbethoxy-N-cyanoacetimidate.
6. Ethyl 2-chloro-N-cyanopropionimidate.
7. A process for preparing an N-cyanoimidate of the formula:

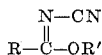

in which R is selected from the group consisting of hydrogen, alkyl, halo-, carbethoxy-, and phenyl-substituted lower alkyl, phenyl, halo-, nitro- and lower alkyl-substituted phenyl and R' is lower alkyl which comprises bringing into reactive contact an otho ester of the formula:

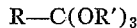

in which R and R' are as defined hereinabove with cyanamide in the presence of an acid anhydride selected from the group consisting of acetic anhydride and propionic anhydride at a temperature of from about 120° C. to about 150° C.
8. A process for preparing an N-cyanoimidate of the formula:

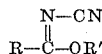

in which R is selected from the group consisting of hydrogen, alkyl, halo-, carbethoxy- and phenyl-substituted lower alkyl, phenyl, halo-, nitro- and lower alkyl-substituted phenyl and R' is lower alkyl which comprises bringing into reactive contact a ketene acetal of the formula:

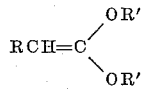

in which R and R' are as defined hereinabove with cyanamide in the presence of an acid anhydride selected from the group consisting of acetic anhydride and propionic anhydride at a temperature of from about 120° C. to about 150° C.
9. A process for preparing an N-cyanoimidate of the formula:

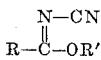

in which R is selected from the group consisting of hydrogen, alkyl, halo-, carbethoxy- and phenyl-substituted lower alkyl, phenyl, halo-, nitro- and lower alkyl-substituted phenyl and R' is lower alkyl which comprises bringing into reactive contact an imidate hydrohalide of the formula:

in which R and R' are as defined hereinabove and X is halogen with cyanamide at a temperature of from about 0° C. to about 50° C.
10. A process for preparing an N-cyanoimidate of the formula:

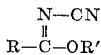

in which R is selected from the group consisting of hydrogen, alkyl, halo-, carbethoxy- and phenyl-substituted lower alkyl, phenyl, halo-, nitro- and lower alkyl-substituted phenyl and R' is lower alkyl which comprises bringing into reactive contact an imidate of the formula:

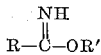

in which R and R' are as defined hereinabove with a cyanogen halide of the formula:

in which X is halogen in the presence of an acid acceptor at a temperature of from about 0° C. to about 30° C.

References Cited by the Examiner

UNITED STATES PATENTS 1,889,323  11/1932  Schmidt et al. _____ 260—453
2,286,380   6/1942  Roblin _____ 260—551

OTHER REFERENCES

Cornforth et al.: Chemical Society Journal (London), 1949, Part II, pages 1549–1553.

Shaw et al.: Chemical Society Journal (London), 1959, Part II, pp. 1648–1655.

CHARLES B. PARKER, *Primary Examiner.*

Disclaimer 3,225,077.—*Frederic Charles Schaefer*, Munich-Solln, Germany and *Kenneth Robert Huffman*, Stamford, Conn. N-CYANOIMIDATES AND PROCESSES FOR PREPARING SAME. Patent dated Dec. 21, 1965. Disclaimer filed Jan. 12, 1972, by the assignee, *American Cyanamid Company*.

Hereby enters this disclaimer to claim 2 of said patent.

[*Official Gazette May 9, 1972.*]